(12) United States Patent
Russo et al.

(10) Patent No.: US 10,764,151 B1
(45) Date of Patent: Sep. 1, 2020

(54) METHODOLOGIES FOR WORKFLOW TRANSITIONING

(71) Applicant: Allscripts Software, LLC, Chicago, IL (US)

(72) Inventors: John David Russo, Boston, MA (US); Jermie Dennis Cullip, Philadelphia, PA (US); Paul William Reilly, Boston, MA (US)

(73) Assignee: ALLSCRIPTS SOFTWARE, LLC, Chicago, IL (US)

( * ) Notice: Subject to any disclaimer, the term of this patent is extended or adjusted under 35 U.S.C. 154(b) by 1864 days.

(21) Appl. No.: 13/826,137

(22) Filed: Mar. 14, 2013

Related U.S. Application Data (63) Continuation of application No. 13/732,138, filed on Dec. 31, 2012, now abandoned.

(60) Provisional application No. 61/740,198, filed on Dec. 20, 2012.

(51) Int. Cl.
*H04L 12/28* (2006.01)
*H04L 12/24* (2006.01)

(52) U.S. Cl.
CPC .................. *H04L 41/18* (2013.01)

(58) Field of Classification Search
CPC .................................. G06G 15/173
USPC ........................................ 709/223
See application file for complete search history.

(56) References Cited

U.S. PATENT DOCUMENTS

| | | | | |
|---|---|---|---|---|
| 7,876,465 B2* | 1/2011 | Matsueda | ............ | G06Q 10/06 358/1.15 |
| 2004/0003029 A1* | 1/2004 | Islam | .................... | G06F 9/505 709/203 |
| 2006/0059253 A1* | 3/2006 | Goodman et al. | ........... | 709/223 |
| 2010/0070422 A1* | 3/2010 | Kikuchi | ............... | G06F 9/5038 705/301 |
| 2011/0239126 A1* | 9/2011 | Erickson, Jr. | ...... | H04N 21/2225 715/744 |
| 2013/0024835 A1* | 1/2013 | Stein et al. | ................... | 717/103 |

* cited by examiner

*Primary Examiner* — Vivek Srivastava
*Assistant Examiner* — Sibte H Bukhari
(74) *Attorney, Agent, or Firm* — Loza & Loza, LLP; Peter Zura (57) ABSTRACT

A method for transitioning workflow execution includes executing, at a workstation utilizing one or more hardware processors of the workstation, a first step of a multi-step workflow; determining, utilizing a workflow engine, that a next step of the multi-step workflow is not required to be executed at a set location, and further determining that the first subsequent step of the multi-step workflow that is required to be executed at a set location is required to be executed at a server; transitioning execution of the multi-step workflow to one or more servers; and executing, at one or more servers utilizing one or more hardware processors of the one or more servers, steps of the multi-step workflow up to and including the step of the multi-step workflow that was identified as being required to be executed at a server.

18 Claims, 6 Drawing Sheets

METHODOLOGIES FOR WORKFLOW TRANSITIONING

CROSS-REFERENCE TO RELATED APPLICATION

The present application is a U.S. continuation patent application of, and claims priority under 35 U.S.C. § 120 to, U.S. nonprovisional patent application Ser. No. 13/732,138, filed Dec. 31, 2012, which nonprovisional patent application and any patent application publications thereof are incorporated by reference herein, and which nonprovisional patent application is a U.S. nonprovisional patent application of, and claims priority under 35 U.S.C. § 119(e) to, U.S. provisional patent application Ser. No. 61/740,198, filed Dec. 20, 2012, which provisional patent application is incorporated by reference herein, and the present application further is a U.S. nonprovisional patent application of, and claims priority under 35 U.S.C. § 119(e) to, U.S. provisional patent application Ser. No. 61/740,198, filed Dec. 20, 2012. The present application hereby incorporates herein by reference the entire disclosure of Appendix A attached hereto.

COPYRIGHT STATEMENT

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

BACKGROUND OF THE INVENTION

The present invention generally relates to workflow execution. Long running workflow processes and especially ones that have long running or highly resource intensive individual steps are prone to failure if run on a user workstation. These failures can occur if the user workstation is powered off, if the user logs off, simply closes the hosted application or the user is interacting with a user interface which blocks background activities from running. Steps that perform their actions without presenting a user interface, even if they aren't highly resource intensive, can impact user experience. Some workflow activities may legitimately be explicitly not set to run in a certain location.

A need exists for improvement in methodologies for handling workflows. This, and other needs, are addressed by one or more aspects of the present invention.

SUMMARY OF THE INVENTION

The present invention includes many aspects and features. Moreover, while many aspects and features relate to, and are described in, the context of optimizing workflow transitioning, the present invention is not limited to use only in this context, as will become apparent from the following summaries and detailed descriptions of aspects, features, and one or more embodiments of the present invention.

Accordingly, one aspect of the present invention relates to a method for transitioning workflow execution comprising executing, at a workstation utilizing one or more hardware processors of the workstation, a first step of a multi-step workflow; determining, utilizing a workflow engine, that a next step of the multi-step workflow is not required to be executed at a set location, and further determining that the first subsequent step of the multi-step workflow that is required to be executed at a set location is required to be executed at a server; transitioning, based at least partially on the determinations that a next step of the multi-step workflow is not required to be executed at a set location and that the first subsequent step of the multi-step workflow that is required to be executed at a set location is required to be executed at a server, execution of the multi-step workflow to one or more servers; and executing, at the one or more servers utilizing one or more hardware processors of the one or more servers, steps of the multi-step workflow up to and including the step of the multi-step workflow that was identified as being required to be executed at a server.

In a feature of this aspect, the workstation is located at a first site and at least one of the one or more servers is located at a second site remote from the first site.

In a feature of this aspect, determining that a next step of the multi-step workflow is not required to be executed at a set location comprises determining that the next step is not a user interface activity.

In a feature of this aspect, the one or more servers is a single server.

In a feature of this aspect, the one or more servers comprises a plurality of servers.

In a feature of this aspect, the workstation and at least one of the one or more servers are located at the same site.

In a feature of this aspect, each step of the multi-step workflow is designated to run on a workstation, is designated to run on a server, or is designated as flexible.

Another aspect relates to a method for transitioning workflow execution. The method includes executing, at a workstation utilizing one or more hardware processors of the workstation, a first step of a multi-step workflow; determining, utilizing a workflow engine, that a certain number of steps of the multi-step workflow to be performed next are not required to be executed at a set location; transitioning, based at least partially on the determination that a certain number of steps of the multi-step workflow to be performed next are not required to be executed at a set location, execution of the multi-step workflow to one or more servers; and executing, at the one or more servers utilizing one or more hardware processors of the one or more servers, steps of the multi-step workflow up to and including the step of the multi-step workflow that was identified as being required to be executed at a server.

In a feature of this aspect, the workstation is located at a first site and at least one of the one or more servers is located at a second site remote from the first site.

In a feature of this aspect, determining that a next step of the multi-step workflow is not required to be executed at a set location comprises determining that the next step is not a user interface activity.

In a feature of this aspect, the one or more servers is a single server.

In a feature of this aspect, the one or more servers comprises a plurality of servers.

In a feature of this aspect, the workstation and at least one of the one or more servers are located at the same site.

In a feature of this aspect, each step of the multi-step workflow is designated to run on a workstation, is designated to run on a server, or is designated as flexible.

Another aspect relates to a method for transitioning workflow execution that includes executing, at a workstation utilizing one or more hardware processors of the workstation, a first step of a multi-step workflow; determining, utilizing a workflow engine, that a next step of the multi-step workflow is not required to be executed at a set location, but that a decision point prevents a determination as to whether the first subsequent step of the multi-step workflow that is required to be executed at a set location is required to be executed at a server; based at least partially on the determination that a decision point prevents a determination as to whether the first subsequent step of the multi-step workflow that is required to be executed at a set location is required to be executed at a server, not transitioning execution of the multi-step workflow; executing the multi-step workflow through the decision point; subsequently determining, utilizing a workflow engine, that a next step of the multi-step workflow is not required to be executed at a set location, and further determining that the first subsequent step of the multi-step workflow that is required to be executed at a set location is required to be executed at a server; transitioning, based at least partially on the determinations that a next step of the multi-step workflow is not required to be executed at a set location and that the first subsequent step of the multi-step workflow that is required to be executed at a set location is required to be executed at a server, execution of the multi-step workflow to one or more servers; and executing, at the one or more servers utilizing one or more hardware processors of the one or more servers, steps of the multi-step workflow up to and including the step of the multi-step workflow that was identified as being required to be executed at a server.

In a feature of this aspect, the workstation is located at a first site and at least one of the one or more servers is located at a second site remote from the first site.

In a feature of this aspect, determining that a next step of the multi-step workflow is not required to be executed at a set location comprises determining that the next step is not a user interface activity.

In a feature of this aspect, the one or more servers is a single server.

In a feature of this aspect, the one or more servers comprises a plurality of servers.

In a feature of this aspect, the workstation and at least one of the one or more servers are located at the same site.

In addition to the aforementioned aspects and features of the present invention, it should be noted that the present invention further encompasses the various possible combinations and subcombinations of such aspects and features. Thus, for example, any aspect may be combined with an aforementioned feature in accordance with the present invention without requiring any other aspect or feature.

BRIEF DESCRIPTION OF THE DRAWINGS

One or more preferred embodiments of the present invention now will be described in detail with reference to the accompanying drawings, wherein the same elements are referred to with the same reference numerals, and wherein.

DETAILED DESCRIPTION

As a preliminary matter, it will readily be understood by one having ordinary skill in the relevant art ("Ordinary Artisan") that the present invention has broad utility and application. As should be understood, any embodiment may incorporate only one or a plurality of the above-disclosed aspects of the invention and may further incorporate only one or a plurality of the above-disclosed features. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. As should be understood, any embodiment may incorporate only one or a plurality of the above-disclosed aspects of the invention and may further incorporate only one or a plurality of the above-disclosed features. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

Regarding applicability of 35 U.S.C. § 112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers." Finally, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Referring now to the drawings, one or more preferred embodiments of the present invention are next described. The following description of one or more preferred embodiments is merely exemplary in nature and is in no way intended to limit the invention, its implementations, or uses.

Multi-step workflows which run over an extended time period and use significant machine resources can adversely affect user experience when run on user workstations. Workflows will fail to produce their intended result if a user powers off the workstation while a multi-step workflow is active on their workstation. In one or more preferred implementations, to alleviate these issues, workflow steps (which can be characterized as activities) can optionally be coerced to run in a particular environment by setting a must-run location. For example, workflow steps can be set to explicitly run at a server, or at a workstation. Workflow steps which do not have a location specified can be characterized as flexible.

Figure 1:
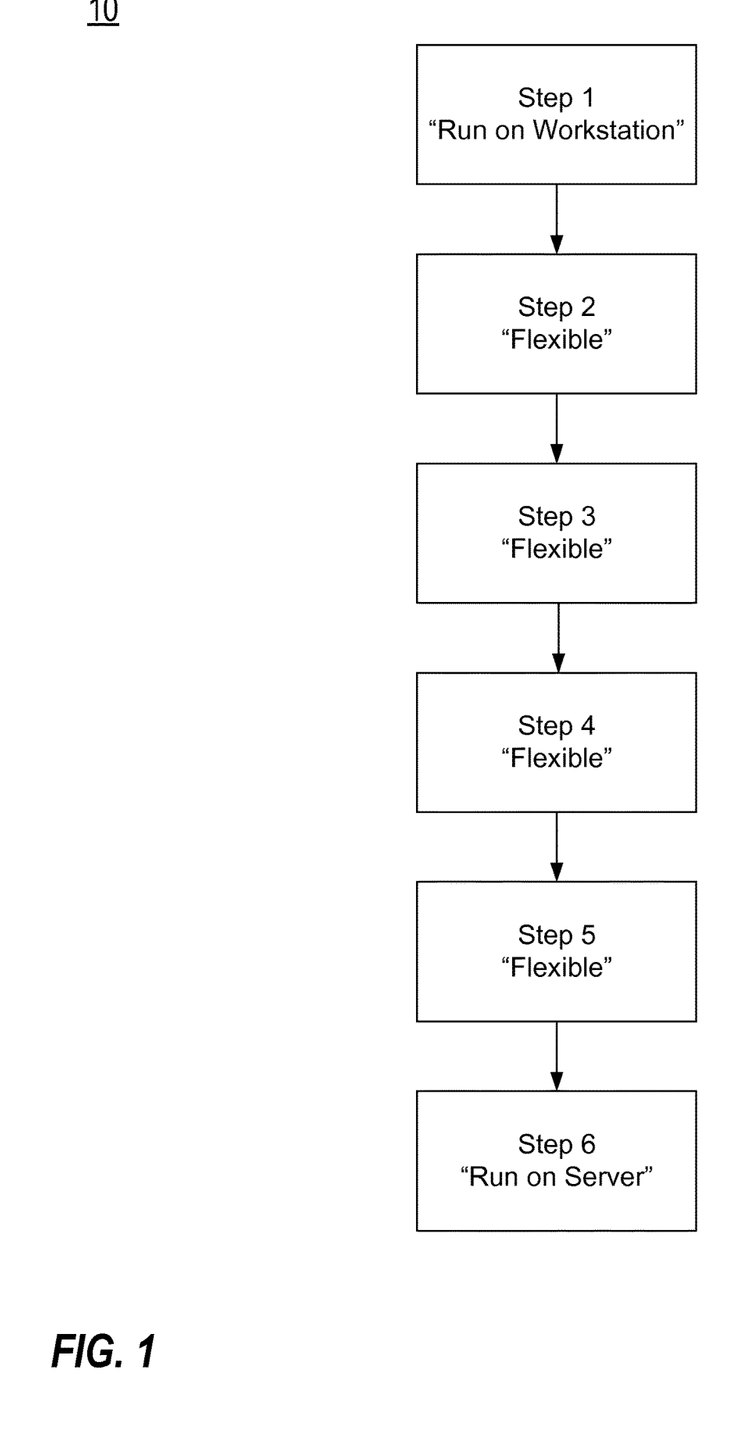
FIG. 1 illustrates an exemplary workflow including six steps.

FIG. 1 illustrates an exemplary workflow 10 including six activities, or steps. Each of the steps is identified as being set to "Run on Workstation", "Run on Server", or as being "Flexible".

During execution of this workflow, one approach would be to run step 1 on a user's workstation, as required by the "Run on Workstation" flag associated with this step, and then continue running step 2 at the same location, since step 2 is flexible, and can thus be run on the user's workstation as well.

In one or more preferred implementations, however, execution of this workflow is automatically optimized by a workflow engine using an algorithm which balances the expense of transitioning the workflow from host to host, with the cost of running the workflow step in the current location. Because the workflow engine uses the workflow diagram to drive execution of the specific workflow steps, the engine effectively looks ahead past flexible steps to determine whether and when to transition execution of the workflow to another location (and can be characterized as optimizing workflow transitioning). In one or more preferred implementations, a look-ahead algorithm transitions "flexible" steps to a server as soon as practical, but not if the expense of doing so would outweigh the benefits. Preferably, activities transition as few times as possible, but transition to a server as early as possible so that expensive processing occurs on a Workflow Server. In one or more preferred implementations, the preference is for non-user interface activities to run on a server to offload processing from user workstations for performance and safety reasons.

In one or more preferred implementations, at run-time, if an activity about to be run is a flexible activity, the engine looks ahead in the workflow to the first activity which is not flexible. If that activity is set to "Run on Server", and the current location is workstation, then the engine transitions the workflow to the server and continues processing, otherwise, no transition is needed.

Figure 2:
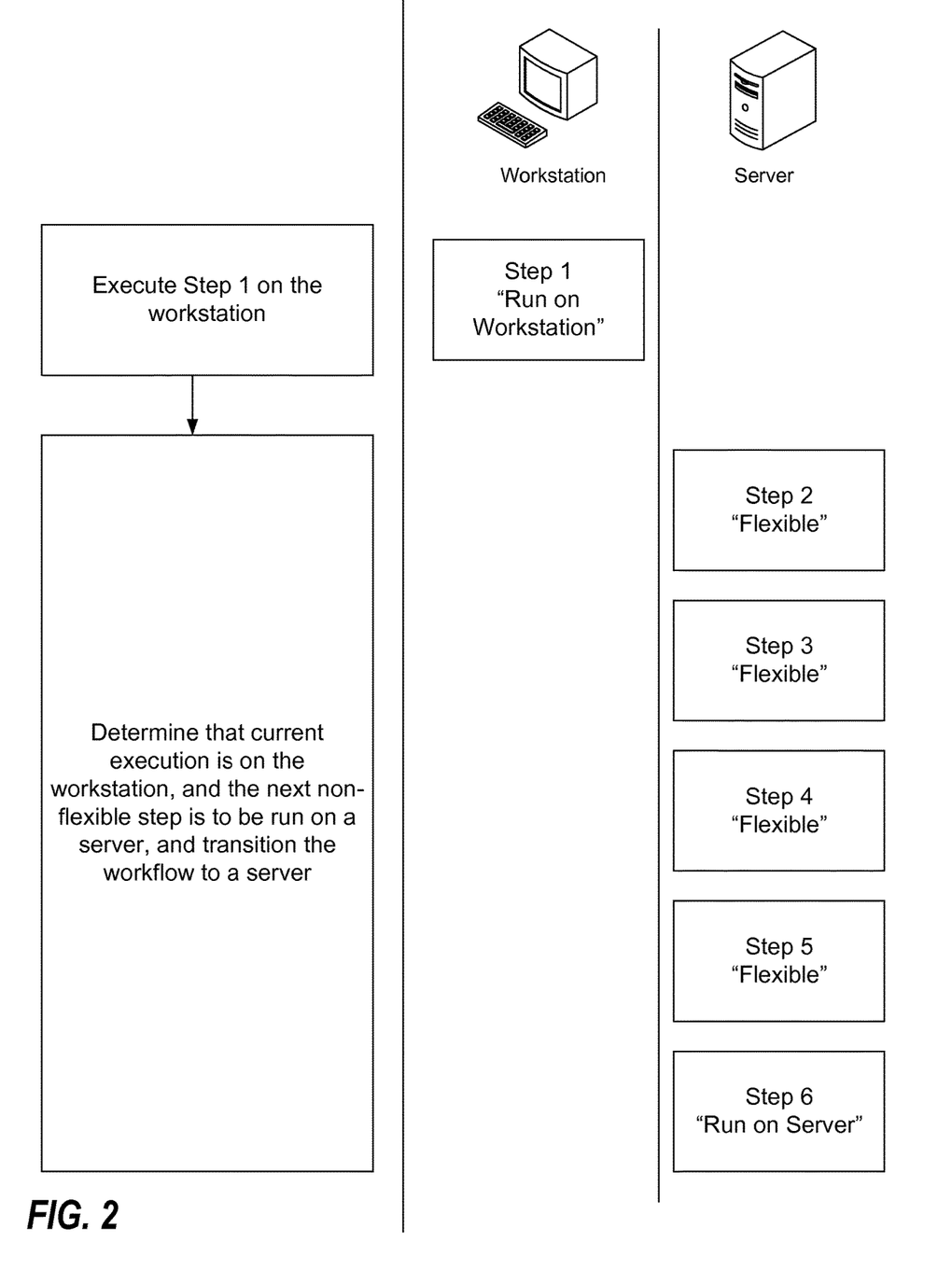
FIG. 2 illustrates an exemplary methodology for transitioning the workflow of FIG. 1.

Notably, it may be necessary to look ahead several activities for an explicitly set activity. For example, referencing the workflow 10 of FIG. 1, if execution is currently on a workstation and step 2 is about to run, and steps 3, 4, and 5 are all flexible, but step 6 is set to "Run on Server", then steps 2, 3, 4, 5 and 6 preferably all run on the server. FIG. 2 illustrates such a preferred methodology.

Figure 3:
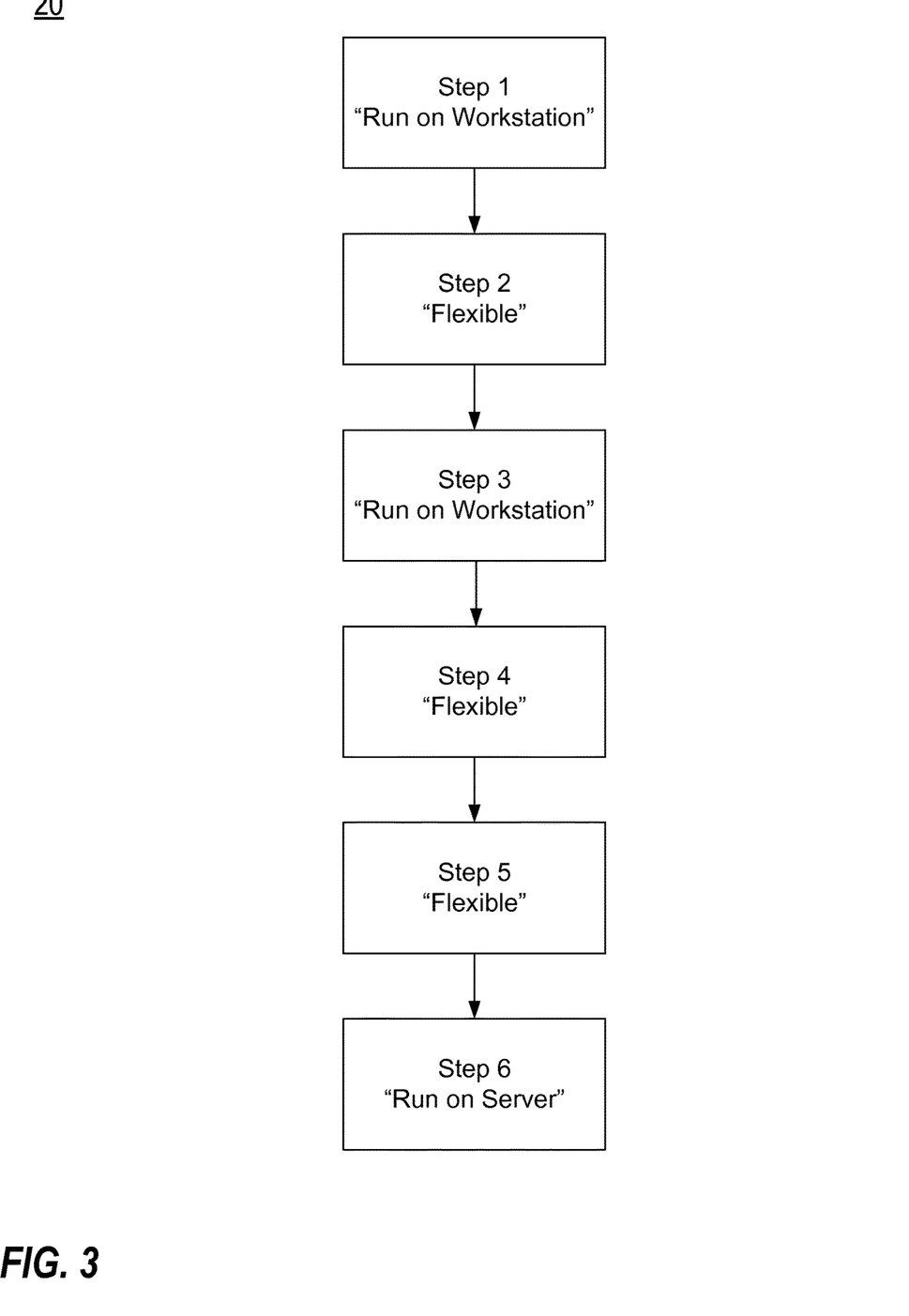
FIG. 3 illustrates an exemplary workflow including six steps.
Figure 4:
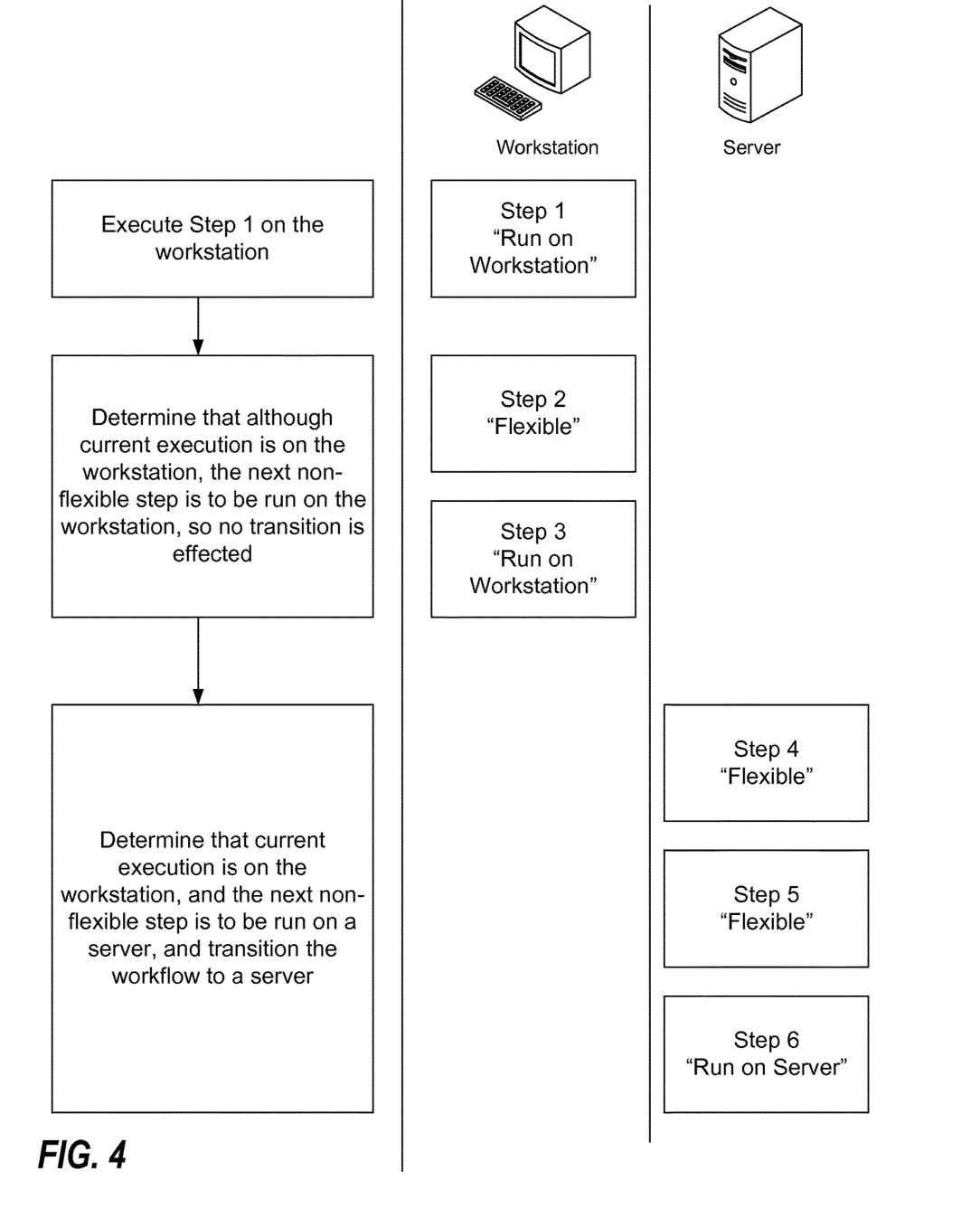
FIG. 4 illustrates an exemplary methodology for transitioning the workflow of FIG. 3.

If, by contrast, in executing a workflow, such as workflow 20 illustrated in FIG. 3, it is determined that, although execution is currently on a workstation, an impending non-flexible step must be run on the workstation, then no transition will be effected, as illustrated in FIG. 4. In some preferred implementations, a workflow engine might be configured to transition a series of flexible steps exceeding a certain length to a server, even if the next non-flexible step is required to be run on a workstation, while in at least some preferred implementations the workflow will not be transitioned if the next non-flexible step is required to be run on a workstation.

Figure 5:
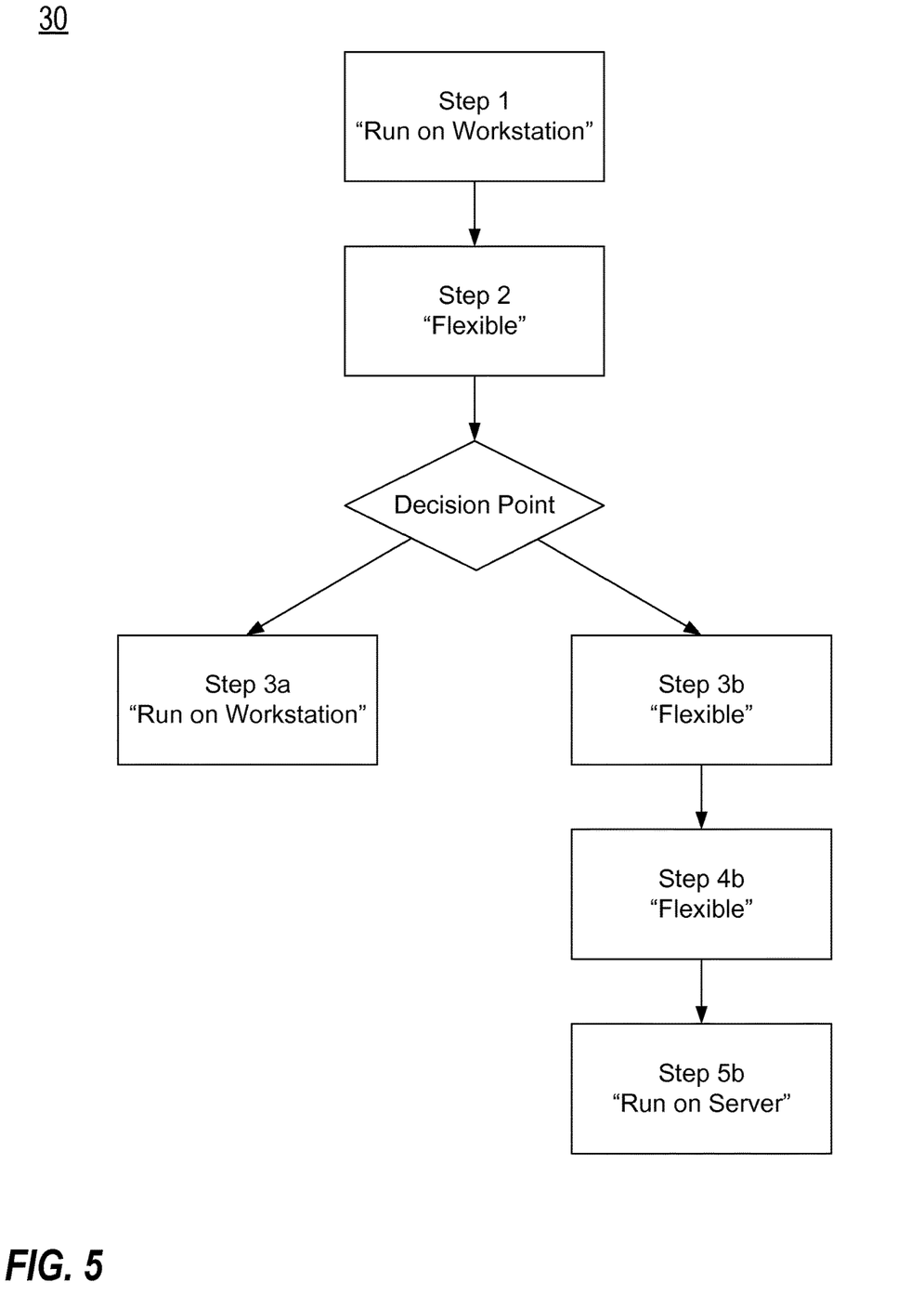
FIG. 5 illustrates an exemplary workflow including six steps.
Figure 6:
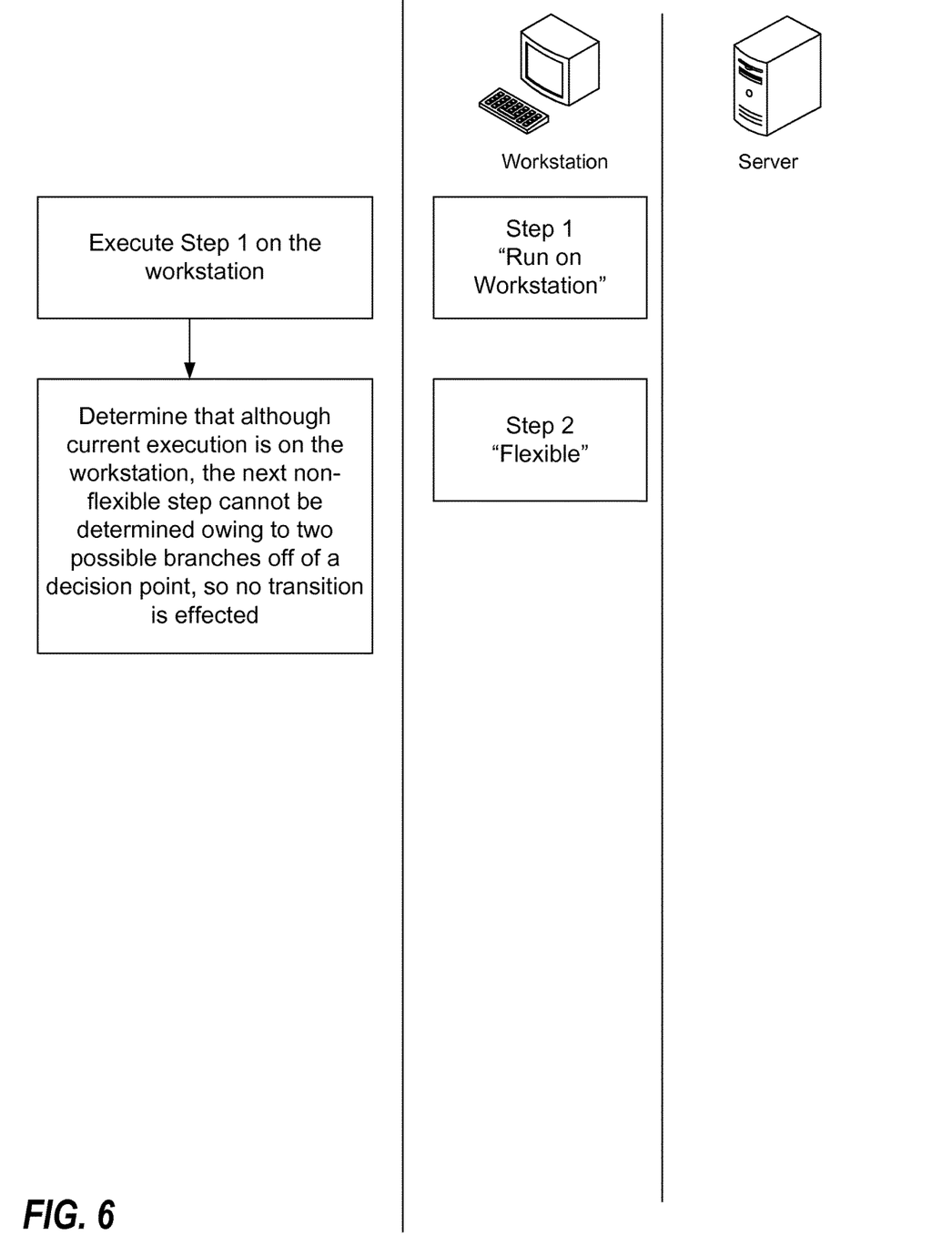
FIG. 6 illustrates exemplary non-transitioning of a workflow including a decision point.

Further, in one or more preferred implementations, in executing a workflow, such as workflow 30 illustrated in FIG. 5 that includes a decision point, if it cannot be determined whether the next explicitly set activity is "Run on Server" (e.g. because of a flow decision between the current location and the next explicitly set activity), no transition is effected, as illustrated in FIG. 6.

Based on the foregoing description, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention. Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements, the present invention being limited only by the claims appended hereto and the equivalents thereof.

What is claimed is:

1. A method for transitioning workflow execution comprising:
    (a) setting, for one or more steps of a multi-step workflow, a must-run location to specify
        (i) that the respective step is server-running and is required to be executed at a server, or
        (ii) that the respective step is workstation-running and is required to be executed at a workstation,
        (iii) wherein steps which do not have a set must-run location are flexible and can be run at a server or a workstation;
    (b) executing, at a first workstation utilizing one or more hardware processors of the first workstation, a first step of the multi-step workflow;
    (c) determining, utilizing a workflow engine, (i) that a next step of the multi-step workflow does not have a set must-run location and thus is flexible and not required to be executed at a set location, and (ii) that the first subsequent step of the multi-step workflow that does have a set must-run location and thus is required to be executed at a set location is set to be server-running and is thus required to be executed at a server;

(d) transitioning execution of the multi-step workflow to one or more servers, based at least partially on the determinations (i) that a next step of the multi-step workflow does not have a set must-run location and thus is flexible and is not required to be executed at a set location, and (ii) that the first subsequent step of the multi-step workflow that does have a set must-run location and thus is required to be executed at a set location is set to be server-running and thus is required to be executed at a server; and (e) executing, at the one or more servers utilizing one or more hardware processors of the one or more servers, steps of the multi-step workflow up to and including the step of the multi-step workflow that was identified as being required to be executed at a server; and (f) subsequently determining, utilizing the workflow engine, that another next step of the multi-step workflow does not have a set must-run location and thus is flexible and not required to be executed at a set location.

2. The method of claim 1, wherein the first workstation is located at a first site and at least one of the one or more servers is located at a second site remote from the first site.

3. The method of claim 1, wherein one of the steps of the multi-step workflow which is set to be workstation-running is a user interface activity.

4. The method of claim 1, wherein the one or more servers is a single server.

5. The method of claim 1, wherein the one or more servers comprises a plurality of servers.

6. The method of claim 1, wherein the first workstation and at least one of the one or more servers are located at the same site.

7. A method for transitioning workflow execution comprising:

(a) setting, for one or more steps of a multi-step workflow, a must-run location to specify (i) that the respective step is server-running and is required to be executed at a server, or (ii) that the respective step is workstation-running and is required to be executed at a workstation, (iii) wherein steps which do not have a set must-run location are flexible and can be run at a server or a workstation;

(b) executing, at a first workstation utilizing one or more hardware processors of the first workstation, a first step of the multi-step workflow;

(c) determining, utilizing a workflow engine, (i) that a first certain number of steps of the multi-step workflow to be performed next are flexible and are not required to be executed at a set location, and (ii) that the first number exceeds a certain length;

(d) transitioning execution of the multi-step workflow to one or more servers, based at least partially on the determinations (i) that the first number of steps of the multi-step workflow to be performed next are flexible and are not required to be executed at a set location, and (ii) that the first number exceeds the certain length; and (e) executing, at the one or more servers utilizing one or more hardware processors of the one or more servers, steps of the multi-step workflow; and (f) subsequently determining, utilizing the workflow engine, that another next step of the multi-step workflow does not have a set must-run location and thus is flexible and not required to be executed at a set location.

8. The method of claim 7, wherein the workstation is located at a first site and at least one of the one or more servers is located at a second site remote from the first site.

9. The method of claim 7, wherein one of the steps of the multi-step workflow which is set to be workstation-running is not a user interface activity.

10. The method of claim 7, wherein the one or more servers is a single server.

11. The method of claim 7, wherein the one or more servers comprises a plurality of servers.

12. The method of claim 7, wherein the workstation and at least one of the one or more servers are located at the same site.

13. A method for transitioning workflow execution comprising:

(a) setting, for one or more steps of a multi-step workflow, a must-run location to specify (i) that the respective step is server-running and is required to be executed at a server, or (ii) that the respective step is workstation-running and is required to be executed at a workstation, (iii) wherein steps which do not have a set must-run location are flexible and can be run at a server or a workstation, (b) executing, at a workstation utilizing one or more hardware processors of the workstation, a first step of the multi-step workflow;

(c) determining, utilizing a workflow engine, (i) that a next step of the multi-step workflow does not have a set must-run location and thus is flexible and not required to be executed at a set location, and (ii) that a decision point prevents a determination as to where the first subsequent step of the multi-step workflow that has a set must-run location is required to be executed;

(d) based at least partially on the determinations (i) that the next step of the multi-step workflow does not have a set must-run location and is thus not required to be executed at a set location, and (ii) that a decision point prevents a determination as to where the first subsequent step of the multi-step workflow that has a set must-run location is required to be executed, not transitioning execution of the multi-step workflow;

(e) executing the multi-step workflow through the decision point;

(f) subsequently determining, utilizing the workflow engine, (i) that another next step of the multi-step workflow does not have a set must-run location and thus is flexible and not required to be executed at a set location, and (ii) that another first subsequent step of the multi-step workflow that does have a set must-run location and is thus required to be executed at a set location is set to be server-running and thus is required to be executed at a server;

(g) transitioning execution of the multi-step workflow to one or more servers, based on one or more of the determinations
   (i) that the another next step of the multi-step workflow does not have a set must-run location and thus is not required to be executed at a set location, and
   (ii) that the another first subsequent step of the multi-step workflow that does have a set must-run location and thus is required to be executed at a set location is set to be server-running and thus is required to be executed at a server; and
(h) executing, at the one or more servers utilizing one or more hardware processors of the one or more servers, steps of the multi-step workflow up to and including the another first subsequent step of the multi-step workflow that was identified as being required to be executed at a server.

14. The method of claim 13, wherein the workstation is located at a first site and at least one of the one or more servers is located at a second site remote from the first site.

15. The method of claim 13, wherein one of the steps of the multi-step workflow which is set to be workstation-running is not a user interface activity.

16. The method of claim 13, wherein the one or more servers is a single server.

17. The method of claim 13, wherein the one or more servers comprises a plurality of servers.

18. The method of claim 13, wherein the workstation and at least one of the one or more servers are located at the same site.

* * * * *